US006722154B1

(12) United States Patent
Tan et al.

(10) Patent No.: US 6,722,154 B1
(45) Date of Patent: Apr. 20, 2004

(54) METAL HYDRIDE BASED AIR COOLING METHOD AND APPARATUS

(75) Inventors: Zhaosheng Tan, Troy, MI (US); Krishna Sapru, Troy, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 0 days.

(21) Appl. No.: 10/435,577

(22) Filed: May 9, 2003

(51) Int. Cl.[7] ............................................... F25B 17/08
(52) U.S. Cl. ........................................... 62/480; 62/106
(58) Field of Search ........................ 62/476, 480, 106; 165/171

(56) References Cited

U.S. PATENT DOCUMENTS

| | | | | |
|---|---|---|---|---|
| 4,108,605 A | * | 8/1978 | Billings | 422/212 |
| 4,290,267 A | * | 9/1981 | Buchner | 60/648 |
| 4,360,505 A | * | 11/1982 | Sheridan et al. | 423/658.2 |
| 4,995,235 A | * | 2/1991 | Halene | 62/46.2 |
| 6,503,298 B1 | * | 1/2003 | Monzyk et al. | 95/96 |

* cited by examiner

Primary Examiner—Melvin Jones
(74) Attorney, Agent, or Firm—Anthony Serventi; Marvin S. Siskind

(57) ABSTRACT

The present invention utilizes the hydrogen storage capabilities of hydrogen storage material to dehumidify and cool air flowing into an enclosed area, such as a residential home. The invention provides an apparatus and method that incorporates a hydrogen storage module having a low pressure, the heat retriever module, and a hydrogen storage module having a high pressure, the cooling module, wherein the modules are connected by a pipe or tube that guides the flow of hydrogen gas back and forth between the modules. The heat retriever module is heated to increase the temperature of the heat retriever module and hydrogen gas is desorbed from the hydrogen storage material contained therein, then a valve in the tube or pipe is opened and the hydrogen gas flows to the cooling module. The valve is closed, after the hydrogen gas is absorbed by the hydrogen storage material of the cooling module. The absorption of hydrogen gas causes an increase in temperature of the cooling module. At this point, both modules are cooled, preferably by module fans. The valve is opened and the hydrogen gas escapes back to the heat retriever module. The endothermic hydrogen desorption of the hydrogen gas from the hydrogen storage material of the cooling module reduces the temperature. During this cooling period of the cooling module, passing air is dehumidified and moisture is collected on thermally conductive material, such as aluminum fins on the cooling module, contacting the air.

32 Claims, 10 Drawing Sheets

METAL HYDRIDE BASED AIR COOLING METHOD AND APPARATUS

FIELD OF THE INVENTION

The present invention relates to an apparatus and method that dehumidifies and cools air. More specifically, the present invention discloses an apparatus that preconditions air by utilizing the thermal swing created when hydrogen gas is transferred between hydrogen storage materials to cool and dehumidify incoming or internally re-circulated air and reduce energy costs.

BACKGROUND OF THE INVENTION

Hydrogen is the "ultimate fuel" for the next millennium, and, it is inexhaustible. Hydrogen is the most plentiful element in the universe and can provide an inexhaustible, clean source of energy for our planet, which can be produced by various processes, which include the splitting of water into hydrogen and oxygen. The hydrogen can be stored and transported in solid-state form.

In the past considerable attention has been given to the use of hydrogen as a fuel or fuel supplement. While the world's oil reserves are depletable, the supply of hydrogen remains virtually unlimited. Hydrogen can be produced from coal, natural gas and other hydrocarbons, or formed by the electrolysis of water, preferably via energy from the sun which is composed mainly of hydrogen and can, itself, be thought of as a giant hydrogen "furnace". Moreover hydrogen can be produced without the use of fossil fuels, such as by the electrolysis of water using nuclear or solar energy, or any other form of economical energy (e.g., wind, waves, geothermal, etc.). Furthermore, hydrogen is an inherently low cost fuel. Hydrogen has the highest density of energy per unit weight of any chemical fuel and is essentially non-polluting since the main by-product of "burning" hydrogen is water. Thus, hydrogen can be a means of solving many of the world's energy related problems, such as climate change, pollution, strategic dependency on oil, etc., as well as providing a means of helping developing nations to achieve sustainable growth. However, hydrogen storage principles have not been applied to a preconditioner unit that dehumidifies and cools air and reduces energy consumption.

In the past two decades, heating, ventilation, and air conditioning (HVAC) systems for residential, commercial, and industrial buildings have experienced massive changes. These advanced HVAC systems are currently marketed and used in newly constructed buildings and homes, saving customers billions of dollars. However, there are still tens of millions of existing residential buildings equipped with original, much less energy efficient (up to 30%), HVAC systems. The wasted energy cost that could be recovered from these existing systems through incorporation of energy efficient aftermarket retro-fit kits is estimated at ~$15 billion. Significant reductions of carbon dioxide ($CO_2$) and other pollutants, like nitrous and sulfur oxides ($NO_x$ and $SO_2$), would also be realized through the development and mass adoption of Integrated Systems for Energy-Efficient Space Conditioning. Space air conditioning is a vital component of residential HVAC systems and should be targeted to achieve the greatest incremental energy savings.

A study demonstrated that the energy efficiency could be 20 to 30% higher for air conditioning systems that use active desiccant dehumidification in large HVAC systems for commercial or industrial buildings. It was also shown, however, that these systems are most suitable for large buildings and niche markets, where humidity control and outdoor fresh air inflow are very important, such as: hospitals, nursing homes and assisted living quarters, hotels and research facilities. Hospitals and other special R&D facilities need to introduce large amount of fresh air into the buildings, even as the outdoor air temperature is higher than that of the indoor; the HVAC system with the active desiccant demonstrates significant improvement in efficiency. However, this technology is not cost effective for residential markets due to the high capital cost of the desiccant equipment and less energy saving for smaller scale of air-cooling. Therefore, it is perceived by consumers that the energy saving by the active desiccant HVAC system will not offset the upfront cost of the installation.

The majority of residential air conditioning systems are not equipped with separate dehumidification and ventilation systems. The very common case is that homeowners operate a stand-alone dehumidifier in the basement or individual rooms. This type of independent compressor based dehumidifier reduces the humidity of indoor air, but rejects heat into the dried air. The heat that needs to be removed includes the latent enthalpy of condensed water and compressor friction. Existing dehumidifiers reduce the amount of water, but since the heat from the dehumidifier raises the indoor air temperature, more electrical energy needs to be used for the air conditioner to pump the heat out. Therefore, this practice is a very inefficient way to achieve comfort.

As a result of the forgoing, there exists a need in the art for an energy efficient apparatus and method to reduce the energy load on existing AC systems and operate independent of AC systems. To date, no one has applied the hydrogen absorption/desorption capabilities of metal hydrides to dehumidify and cools air. The present invention discloses an energy efficient metal hydride based apparatus and method for reducing the relative humidity of air that may be used to precondition air entering an AC system and utilizing waste heat from the AC system. Additionally, the present invention discloses an energy efficient metal hydride based apparatus and method for reducing the relative humidity of air that may be used independent of an AC system.

SUMMARY OF THE INVENTION

The present invention discloses a novel apparatus that provides separate dehumidification and ventilation that may be used to increase the energy efficiency of residential air conditioning systems, in addition to improving indoor air quality and dwelling comfort. The apparatus and method dehumidifies and cools the incoming air by utilizing the thermal swing created when hydrogen is shuttled between metal hydride alloys to cool and dehumidify incoming or internally re-circulated air. The release of hydrogen from a metal hydride matrix is an endothermic process. The dehydriding process absorbs the heat from the surroundings, such as entering or recirculating air. If the thermal energy latent in the incoming air can be used for the dehydriding process, the incoming air temperature will drop. This drop in the temperature can be used to reduce the water content and thus "pre-condition" the incoming air. This pre-conditioned air requires less energy to cool ("air condition") and because the rate of hydrogen desorption can be regulated, it is possible to actively control humidity levels. This controlled process is powered, preferably by the waste heat of the HVAC system and, thus, significantly improves the efficiency of the overall system. However, the present invention may operate independent of an air conditioning unit. In that embodiment, heat is provided to the system by a different means, such as a solar powered heater.

The metal hydride based air preconditioner of the present invention is fundamentally different from a conventional compressor dehumidifier, and active desiccant based systems. The metal hydride based air preconditioner of the present invention operates by recovering the waste heat from the condenser of the air conditioner. The metal hydride based air preconditioner of the present invention has less moving components and much more energy saving. Since this system is a totally sealed system with no external supply of hydrogen, it is totally safe and reliable. The energy saving is substantial. Not only does it recovers waste heat for the cooling of house air, but it also realizes pre-dehumidification of humid air, which enhances the cooling efficiency of the existing air conditioning system. The installation of an outside air economizer to an existing enclosed area, such as a residential building, improves the indoor air quality and increases comfort; at same time, it is energy saving, environmentally friendly, and potentially cost effective when mass-produced.

The present invention discloses an apparatus and method for cooling and dehumidifying air comprising a first hydrogen storage module having a first plateau pressure at ambient temperature and a second hydrogen storage module having a second plateau pressure at ambient temperature. The present invention may be used in combination with an air conditioning unit or independent of an air conditioning unit. Each hydrogen storage module contains hydrogen storage material(s) that is capable of absorbing and desorbing hydrogen gas. Generally, when hydrogen gas is desorbed from the hydrogen storage material, the hydrogen gas will flow from a higher pressure to a lower pressure. A valve provides flow communication between the first hydrogen storage module and the second hydrogen storage module. At least one reversible first module fan may be positioned to force air to and from the first hydrogen storage module and at least one reversible second module fan may be positioned to force air to and from the second hydrogen storage module. The second module fan may be incorporated to cool the second module or heat the module by forcing waste from the condenser into contact with the second hydrogen storage module. This may further include a control unit operably coupled to the first hydrogen storage module, the second hydrogen storage module, the first module fan, the second module fan and the valve. Preferably, the second pressure is the ambient pressure of the environment at ambient temperature and the first pressure comprises at most 300 psia at the ambient temperature. However, the first plateau pressure may be higher than 300 psia depending on the environmental conditions, such as temperature and altitude. As the second hydrogen storage module is heated, hydrogen gas is released from the hydrogen storage material contained therein and the pressure in the second module rises as the temperature rises. As a result, the pressure of hydrogen gas in the second hydrogen storage module is raised to a point higher than the pressure in the first hydrogen storage module. When the valve is opened, hydrogen gas flows from the second hydrogen storage module into the first hydrogen storage module and the hydrogen gas is absorbed into the hydrogen storage material contained therein and then the valve is closed. Then, the second hydrogen storage module is cooled, preferably by an electric fan powered by solar energy, and the first hydrogen storage module is heated. As a result, the pressure of the hydrogen gas in the first hydrogen storage module is raised to a point higher than the pressure in the second hydrogen storage module. The valve is opened and the hydrogen gas flows back into the second hydrogen storage module. As the hydrogen gas flows to the second hydrogen storage module and the first hydrogen storage module cools, passing air is dehumidified and moisture in the air collects on thermally conductive fins protruding from the first hydrogen storage module. The moisture may be collected and released from the system using a water drain.

The apparatus may further comprise series of conduits to maximize the flow of cool air into and warm air out of to be cooled, such as a residential home. The conduits include a first air conduit having a first end terminating in the area to be cooled and a second end terminating in an area outside the area to be cooled and a second air conduit having a first end terminating in an area to be cooled and a second end terminating in the first air conduit. The first hydrogen storage module may be set in the first air conduit between the first end of the first air conduit and the second end of the second air conduit. The conduits may further comprise a third air having a first end connected to the second end of the first air conduit and a second terminating in the area outside the area to be cooled and a fourth air conduit having a first end terminating in the first air conduit and a second end terminating in the area outside the area to be cooled. Further, an air filter may be set in the third conduit to filter larger particles from the incoming air.

The apparatus may further comprise a means for restricting air flow, such as a damper, in the first air conduit and a means for restricting air flow, such as a damper, in the second air conduit. The first damper may be set to shift from restricting air flow through the first end of the first air conduit and restricting air flow through the first end of the fourth air conduit and the second damper may be adapted to shift from restricting air flow through the second end of said second air conduit and restricting air flow through the second end of the first air conduit. Motors controlling the dampers may be operably coupled to the control unit.

The apparatus may further include a condenser coil that guides a flow of refrigerant pumped by a refrigerant pump through the system to and from the cooling coil of an air conditioner. In an embodiment of the present invention, the condenser coil guides the refrigerant through the condenser only and a fan is used to cool the second hydrogen storage module. In a preferred embodiment, the condenser coil is adapted to guide the refrigerant through the condenser coil and the second hydrogen storage module. In this embodiment, the condenser and the second hydrogen storage module may be compartmentally separated. As the second hydrogen storage module is heated, a series of refrigerant valves guide the refrigerant through the condenser. However, when the second hydrogen storage module is cooled, the refrigerant valves are manipulated to guide the flow of refrigerant through the second hydrogen storage module to assist the fan in cooling. The control unit may control the refrigerant valves.

The present invention discloses a novel method of cooling and dehumidifying air comprising providing a first hydrogen storage module having a first pressure in flow communication with a second hydrogen storage module having a second pressure. The first pressure is higher than the second pressure at ambient temperature. However, the first and second pressures are sufficiently close to enable an increase in temperature of the second hydrogen storage module (to about 120° C.) to increase the pressure of the second hydrogen storage module to a level above the ambient temperature pressure of the first hydrogen storage module that forces hydrogen gas from the second hydrogen storage module to flow into the first hydrogen storage module. Further, the method includes a first closing of a valve between the hydrogen storage modules, then heating the second hydrogen storage module, which increases in the second pressure. A first opening of the valve causes hydrogen gas to flow from the second hydrogen storage module into the first hydrogen storage module and an increase in temperature of the first hydrogen storage module, then, preferably after the first hydrogen storage module is fully charged with the hydrogen gas, a second closing of the valve is performed. The second hydrogen storage module is then cooled and the second hydrogen storage module undergoes a reduction in the second pressure. Preferably, the second hydrogen storage module is cooled by a reversible fan. A second opening of the valve causes hydrogen gas to flow from the first hydrogen storage module into the second hydrogen storage module. The desorption of hydrogen gas from the first hydrogen storage module cools the first hydrogen storage module and air flowing past the first hydrogen storage module is dehumidified and cooled.

The method may further comprise a series of conduits to force air flow through various points of the apparatus at the appropriate time. For example, the method may simultaneously include forcing warm air from an area to be cooled in through an air conduit from an outside area, during the desorption of the hydrogen gas from the cooling module, diverting the warm air from the air conduit to an outside area into an air conduit having the cooling module and forcing the dehumidified and cooled air into the area to be cooled through the air conduit having the cooling module. The method may further include simultaneously restricting air flow to the area to be cooled during the heating of the heat retriever module, restricting air flow from the outdoor air conduit and diverting air outside through a different air conduit.

BRIEF DESCRIPTION OF THE DRAWINGS

In order to assist in the understanding of the various aspects of the present invention and various embodiments thereof, reference is now made to the appended drawings, in which like reference numerals refer to like elements. The drawings are exemplary only, and should not be construed as limiting the invention.

DETAILED DESCRIPTION OF THE INVENTION

Figure 2:
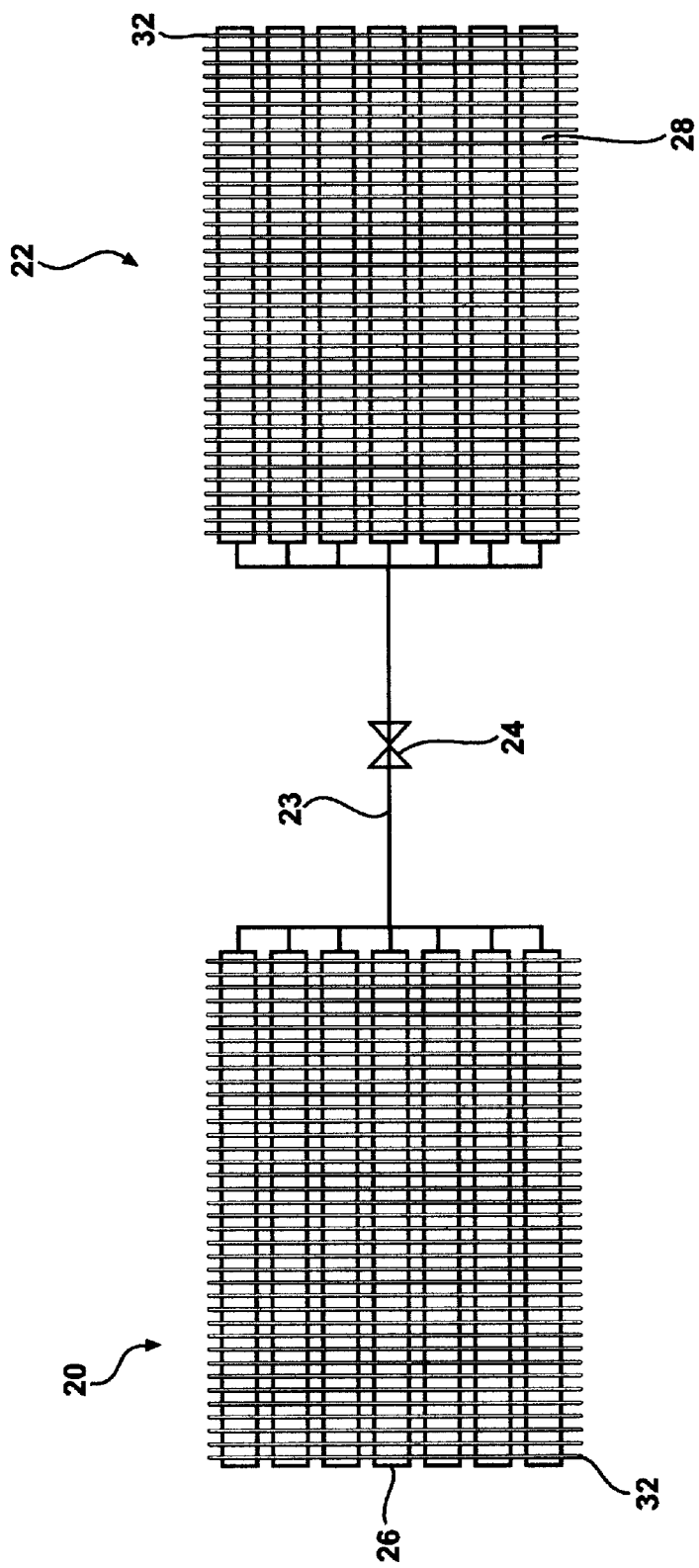
FIG. 2 is an illustration of an embodiment of the hydrogen storage modules of the modular metal hydride based dehumidifier of the present invention.
Figure 3:
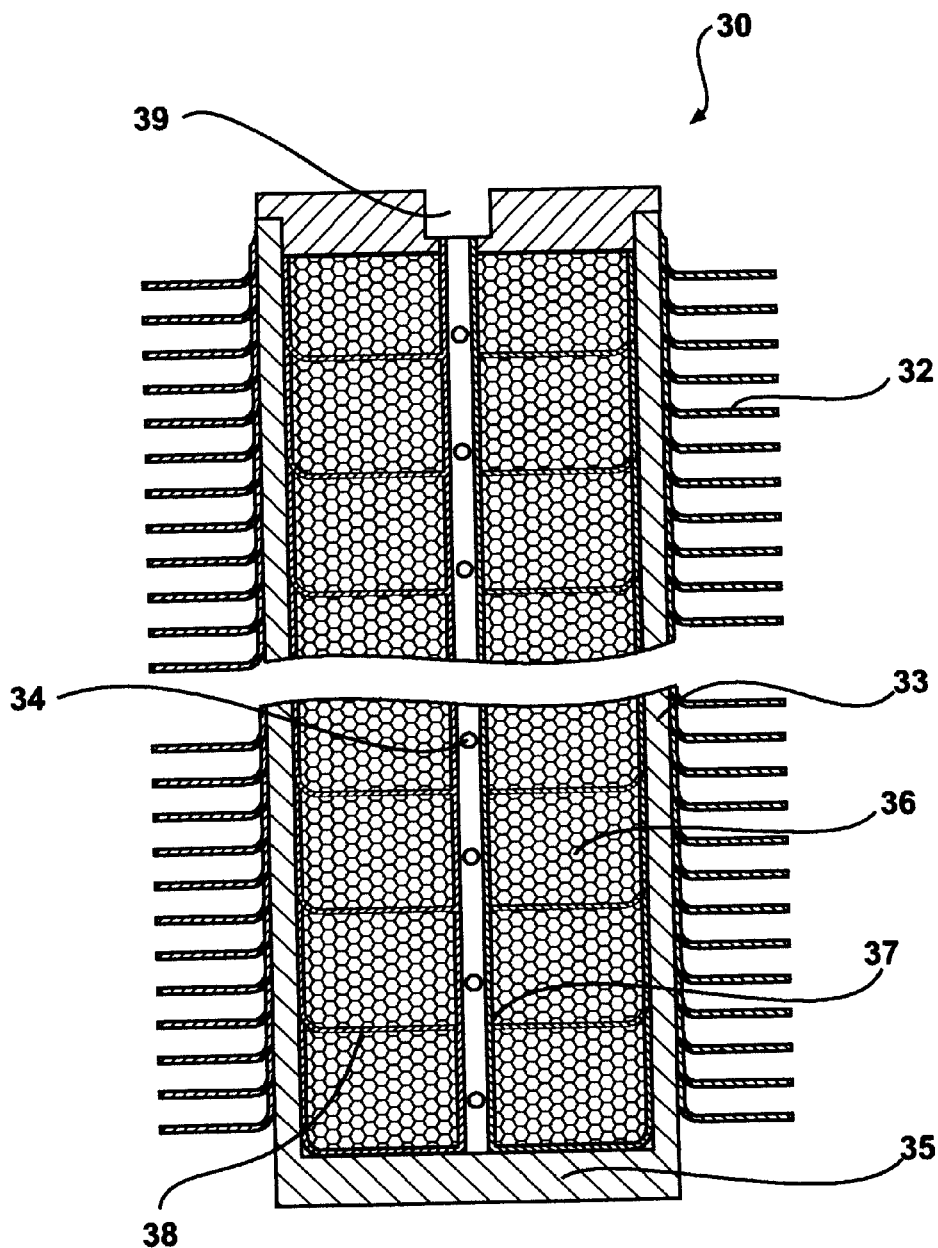
FIG. 3 is a cross sectional illustration of an embodiment of the inner tubular structure of a metal hydride module of the present invention.

An embodiment of the present invention includes metal hydride storage modules 20 and 22, as illustrated in FIG. 2. The first module 20 is identified as a cooling module, and the second module 22 is identified as a heat retriever. Each individual model 20 and 22 is made of metallic tubes containing a hydrogen storage medium 36 that absorbs and desorbs hydrogen, and means of heat exchange 32, as illustrated in FIG. 3. The medium 36 may be hydrogen storage material, preferably a metal hydride, such as those described in U.S. patent application Ser. No. 10/247,536 entitled "High Capacity Transition Metal Based Hydrogen Storage Materials for the Reversible Storage of Hydrogen" filed by Sapru et al. on Sep. 18, 2002; U.S. Pat. No. 6,193,929 entitled "High Storage Capacity Alloys Enabling a Hydrogen-Based Ecosystem" issued to Ovshinsky, et al. on Feb. 27, 2001; U.S. Pat. No. 4,832,913 entitled "Hydrogen Storage Materials Useful for Heat Pump Applications" issued to Hong, et al. on May 23, 1989, all of which are hereby incorporated herein by reference. The hydrogen storage material is any alloy with the necessary characteristics. The hydrogen storage alloy, preferably metal hydride, in each module 20 and 22 may be different or the same with respect to the modules. Preferably, the temperatures for absorption and desorption for the respective alloys in each module are sufficiently close to enable the flow of hydrogen gas between the respective modules as the modules are heated and cooled in the range of about 60° F. to about 120° F. The hydrogen storage material may be selected from Rare-earth/Misch metal alloys, zirconium alloys, titanium alloys, and mixtures or alloys thereof, which may be AB, $AB_2$, or $AB_5$ type alloys or a mixture thereof Preferably, the hydrogen storage material is an $AB_2$ or $AB_5$ type alloy or a mixture thereof The modules 20 and 22 are connected through a valve 24 controlled by temperature or pressure of inside hydrogen gas. Preferably the valve 24 is a solenoid valve connected to the control unit, as will be discussed in more detail below, however other valves may be incorporated. The heat retriever module 22 preferably contains low pressure metal hydride 28, at ambient temperature. The heat retriever module 22 may have a pressure at or near ambient pressure at the beginning of a cycle. When the present invention is integrated into an air conditioning unit, the heat retriever module 22 is preferably placed near the condenser or incorporated as a part of the condenser of the air conditioner to utilize waste heat from the condenser. However, when the present is used independent of an air conditioning unit, the heat retriever module may be contact heat supplied by another source, such as a solar powered heater or a heating coil. The cooling module 20 preferably contains high plateau pressure metal hydride 26, which means that the alloy has a high plateau pressure at ambient temperature, preferably about 300 psi, because low pressure relaxes safety concern and imposes less restriction to components and materials, hence decreases manufacturing cost. However, pressure limit may be higher than 300 psig in applications where high temperature heating and high plateau pressure metal hydride are involved. A higher maximum operation pressure is allowable under the operating principle of the present invention. The pressure of the heat retriever module 22 is raised to a point sufficiently higher than the pressure of the cooling module 20 to effectuate the transfer of hydrogen gas from the heat retriever module 22 to the cooling module 20, when the temperature of the heat retriever module 22 is raised, as will be discussed in more detail below. The various parts of the hydrogen storage modules should be constructed with material that will not break down in the system as the temperature of the heat retriever reaches up to 120° C. for the present invention.

A cross-section view of a hydrogen storage unit (i.e. metal hydride module) for use in accordance with the present invention is depicted in FIG. 3. Preferably, the metal hydride module 30 has a cylindrical shape, however, other designs may be used in accordance with the present invention. Heat conductive segmental plates 38 are used to segment the interior of the metal hydride storage modules 30. The heat conductive segmental plates 38 have a tight contact with the interior wall of the hydride storage modules 30, where the heat exchange between the metal hydride and the surroundings takes place. This segmental partition improves packing uniformity and increases mechanical integrity. This structure has been proved very effective in enhancing gas flow while holding the metal particles in place, and preventing their escape from the system. The preferred construction material for the metal plates 38 is a metal such as copper or aluminum. However, other metals such as stainless steel may be used. Additionally, the metal of the metal plates 38 is preferably a metal that does not act as a hydrogen absorbing material.

Referring to FIG. 3, an individual metal hydride module 20 and 22 is structured as an array of tubes 30 embedded in a plurality of heat conductive fins 32. Each metal hydride tube, represented at 30, is inserted through a plurality of fins 32 with the module wall 33 abutting the fins 32. The fins 32 are a means of heat exchange. The heat conductive fins 32 have a plurality of L-ledged holes through which the metal hydride modules 30 are placed. The L-ledged holes are slightly smaller than the diameter of the metal hydride modules 30 to provide a tight fitting heat transferring area between the metal hydride storage modules 30 and the heat conductive fin 32 upon insertion of the metal hydride module 30 into the heat conductive fin 32. Preferably, the fins are constructed of a thermally conductive material and in an embodiment, the thermally conductive material is in thermal contact with the first hydrogen storage material. More preferably, the fins are constructed of a thermally conductive, light weight, corrosion resistant material, such as aluminum. However, other construction materials for the thermal conductive fins may include copper or stainless steel. The fins should be constructed to dissipate heat by maximizing surface area. The geometry of tubes 30 and fins 32 are preferably defined to maximize the air heat exchange for both metal hydride modules 20 and 22. Generally, smaller metal hydride tubes and larger fin surface area will enhance the heat transfer and water condensation efficiency. The material for the tubes 30 containing the metal hydride 36 may be a strong, high corrosion resistant metal, preferably stainless steel. However, other materials may be used, such as copper, brass and aluminum. An embodiment of the internal structure for the compaction of metal hydride materials is illustrated in FIG. 3.

To enhance hydrogen gas flow in or out from the solid hydrogen storage media, at least one gas filtration/ distribution tube 34 may be inserted longitudinally through the metal hydride tubes, as illustrated in FIG. 3. The filtration tube may be comprised of a perforated tube 34, wrapped with fine-sized wire woven cloth 37 and a port 39 that acts as an entrance and exit for the hydrogen gas. The gas filtration/distribution tube 34 preferably has a thin wall and small diameter to optimize room for hydrogen storage. The gas filtration/distribution tube 34 allows hydrogen to enter and exit the metal hydride tube 30. The gas filtration/ distribution tube 34 may be wrapped with stainless steel wire cloth 37 to allow only hydrogen to pass, while keeping the hydrogen storage alloy medium 36 from escaping into the gas filtration/distribution tube 34. The heat conductive segmental plates 38 may have one or more holes to accommodate the gas filtration/distribution tubes 34. The gas filtration/distribution tubes 34 may terminate adjacent to a filter at the port 39 to further prevent metal hydride fines from escaping the metal hydride tubes 30. The preferred construction material for the perforated tube 34 is a metal such as aluminum or brass. The preferred construction material for the wire woven cloth 37 is stainless steel.

Metal wool pads may be placed at the top and bottom of each metal hydride tube. The wool pads act as an elastic sponge to absorb the expansion and contraction of the metal hydride. The wool pads aid in reducing the stress placed on the ends and walls of the metal hydride tubes.

Figure 8A:
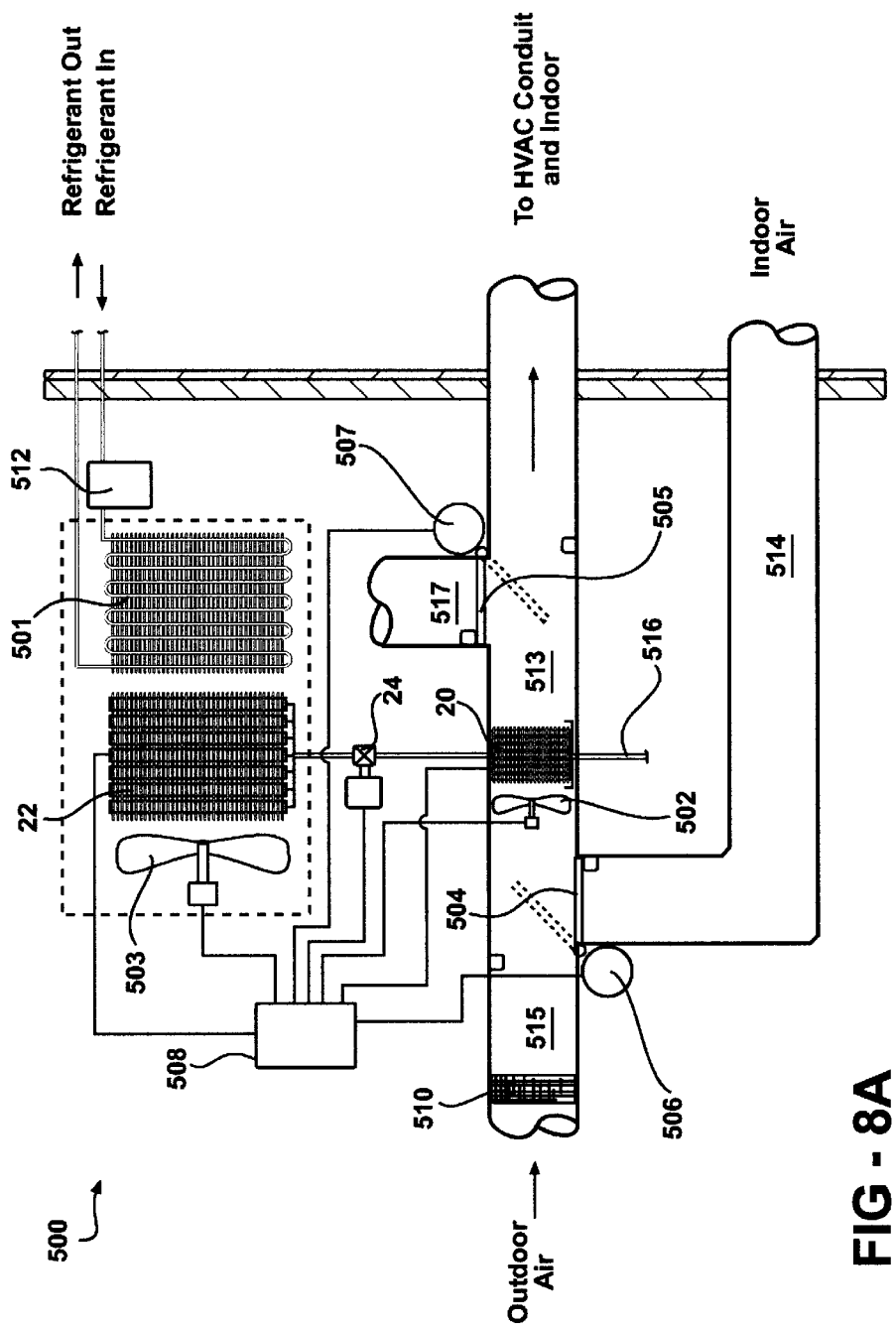
FIG. 8A is an illustration of the dampers in a position of inactivity to allow air to flow from the cool outdoor area to an indoor area.

Referring again to FIG. 5, an embodiment of the metal hydride air preconditioner is illustrated, generally referred to as 500. The system is comprised of metal hydride modules 20 and 22, hydrogen gas line 23, inline hydrogen gas valve 24, fans 502 and 503, outdoor air damper 504, indoor air damper 505, drive motors and linkage 506 and 507, and electric control unit 508. The control unit 508 is operably coupled to the modules 20 and 22, actuating the fans 502 and 503, valves 24 and 509, and drive motors 506 and 507 for dampers 504 and 505. Additionally, the control unit 508 may be operably coupled to a temperature sensor the monitors the temperature of the heat retriever module 22. The control unit 508 may controls the function of each element to which it is operably coupled, to ensure that various elements are activated and deactivated at the appropriate time. In operation, the electric control unit 508 senses the temperatures of air and modules 20 and 22, actuating the fans 502 and 503, valves 24 and 509, and drive motors 506 and 507 for dampers 504 and 505. When the outdoor air temperature is below that of the indoor air, the outside air is allowed to flow into the enclosed area while the air conditioner is idled, thus reducing the need for electrical cooling and saving energy, as illustrated in FIG. 8A. The air is allowed to flow through the conduit leading outside 515 and the conduit leading to the enclosed area 513 through the cooling module 20.

Figure 8B:
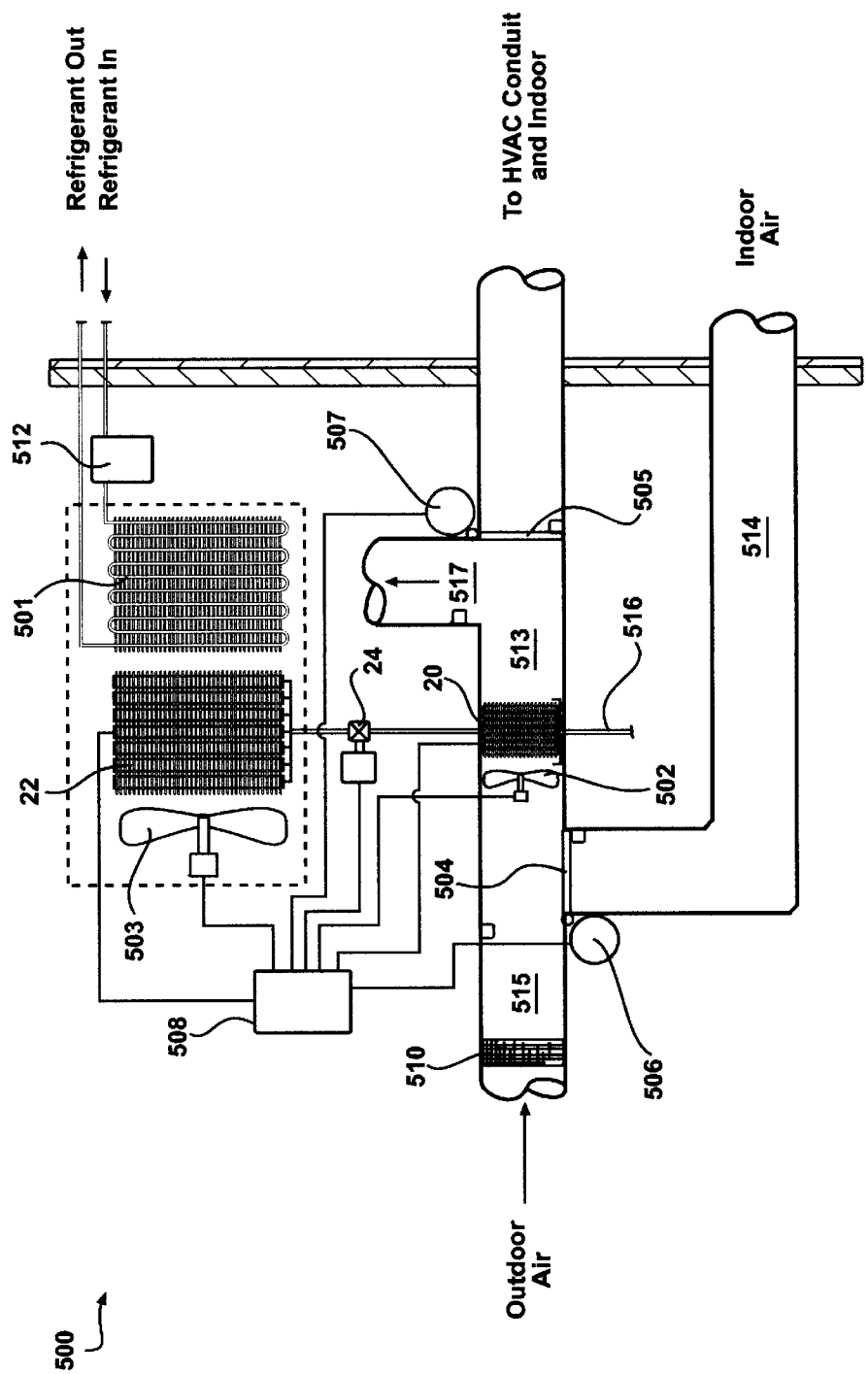
FIG. 8B is an illustration of the dampers as the first hydrogen storage module is absorbing hydrogen gas, warm outdoor air to flow through the first hydrogen storage module to an outdoor air conduit.
Figure 8C:
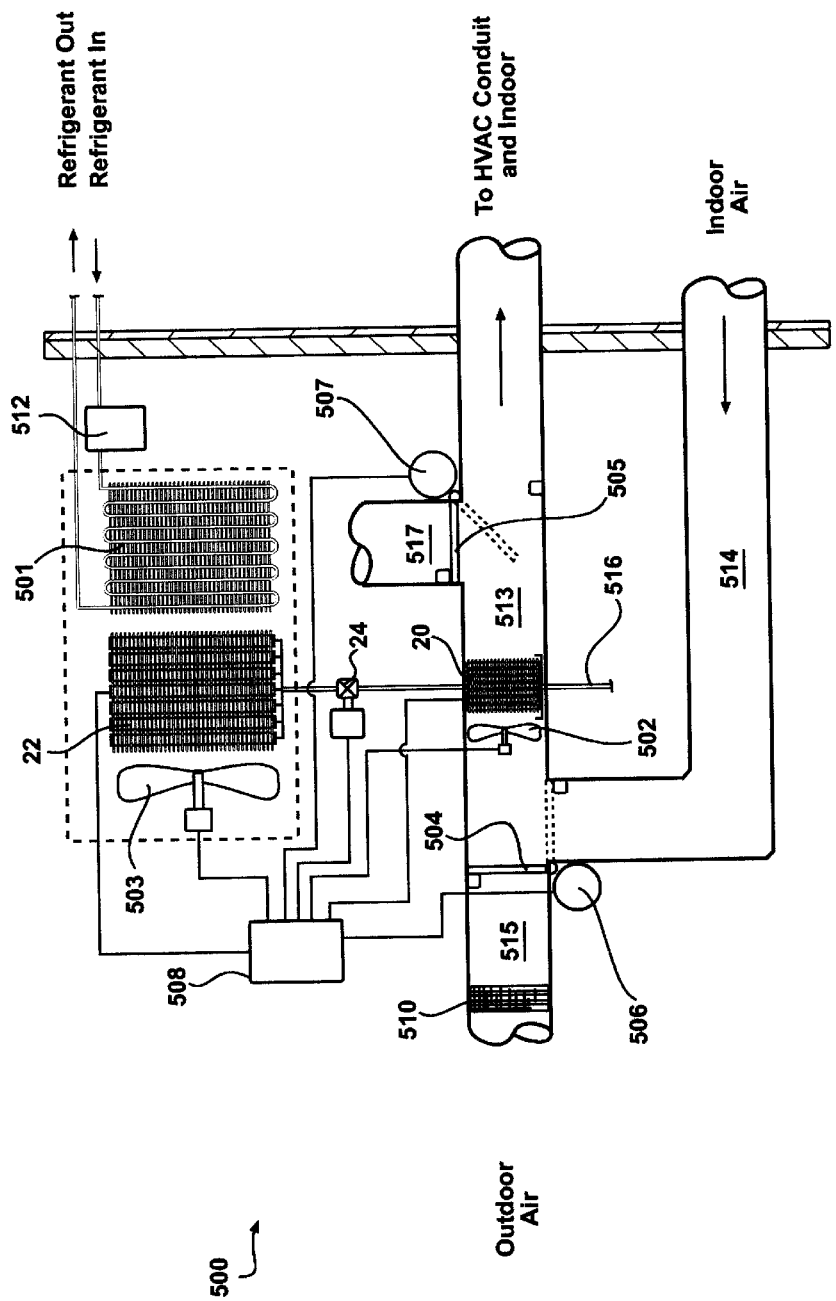
FIG. 8C is an illustration of the dampers as the first hydrogen storage module is dehumidifying passing air, indoor air is circulated through the cooling first hydrogen storage module and moisture is removed from the air.

When the outdoor air temperature is higher, the air conditioner runs. In the warming phase of cooling module 20, the dampers 504 and 505 take positions of closing the air conduits 513 and 514 to the enclosed area, which allows the outside air to flow through the warm cooling module 20 for heat dissipation, as illustrated in FIG. 8B. The warm air is allowed to flow through conduit 515, through the cooling module 20 and out the warm air out conduit 517. In the cooling phase, the dampers 504 and 505 change to positions of shutting off the air conduits to the outside air 515, which allows the air in the enclosed area to be forced through the cooling the cooling module 20, as illustrated in FIG. 8C. During the cooling of the cooling module 20, air is forced out of the enclosed area through a conduit 513 and forced through the cooling module 20. The cooling module 20 removes moisture from the air as the endothermic hydrogen desorption from the cooling module 20 reduces the cooling module 20 temperature. Preferably, a fan 502 is set in a position to assist in the circulation of the warm air through the cooling module 20 and force the cooled air into the enclosed area through a conduit 514. The moisture carried by air condenses on the fins 32 of the cooling module 20, and the condensed water drops out of the system through a water drain 516. An air filter 510 may be set in the conduit 515 for incoming air. The filter 510 helps to keep large air particles from entering the system.

The movement of the dampers 504 and 505 may be controlled by the drive motors 506 and 507. The driver motors 506 and 507 may be controlled by the control unit 508 to open and close at the appropriate moments as described. The dampers 504 and 505 and drive motors 506 and 507 are examples of means of restricting air flow in the respective conduits 513, 514, 515 and 517. Other means of restricting air flow may be incorporated, such as sliding seals integrated into the various openings in the conduits.

A typical residence is either equipped with in window room air conditioners or a central air conditioner. The window air conditioner has four basic components assembled in compact box space: compressor, evaporator, expansion valve, and condenser. The central air conditioner instead has the compressor and evaporator located outside the house and the evaporator integrated with the heat exchange element of the central heating system. The evaporator inside the house is connected with the compressor with thermally insulated plumbing. When the air conditioning system operates, it pumps the heat out of the house, rejecting it to the outside air through the condenser. The coil of the condenser reaches a temperature up to 120° C. and aluminum fins dissipate the heat by forced air convection. This invention also discloses two methods of integration of the heat capture module with the condenser of the air conditioner. By learning the principle demonstrated from these embodiments, other variation of the method could be used in practice.

Figure 5:
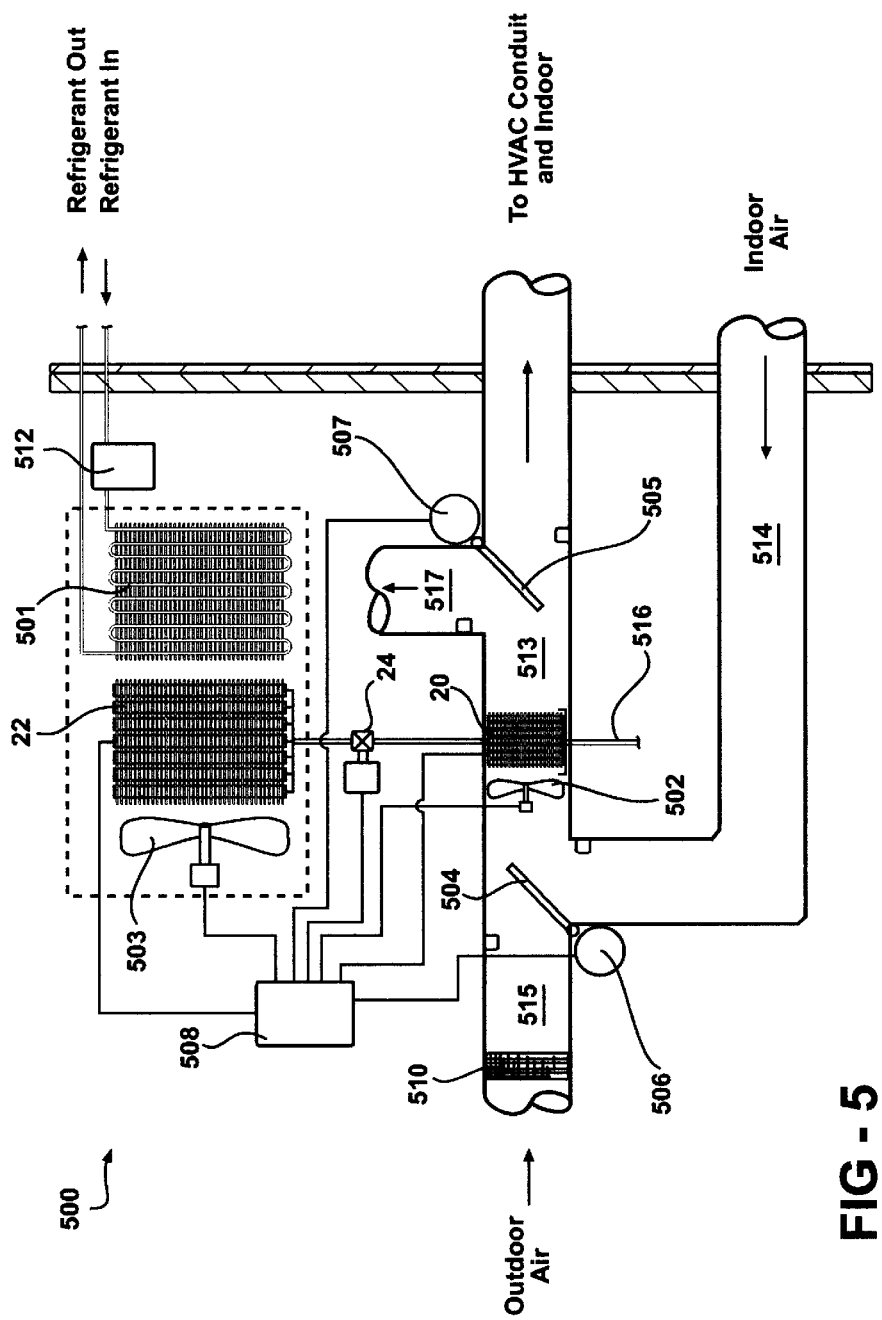
FIG. 5 is an illustration of the metal hydride based air preconditioner apparatus of the present invention.
Figure 6:
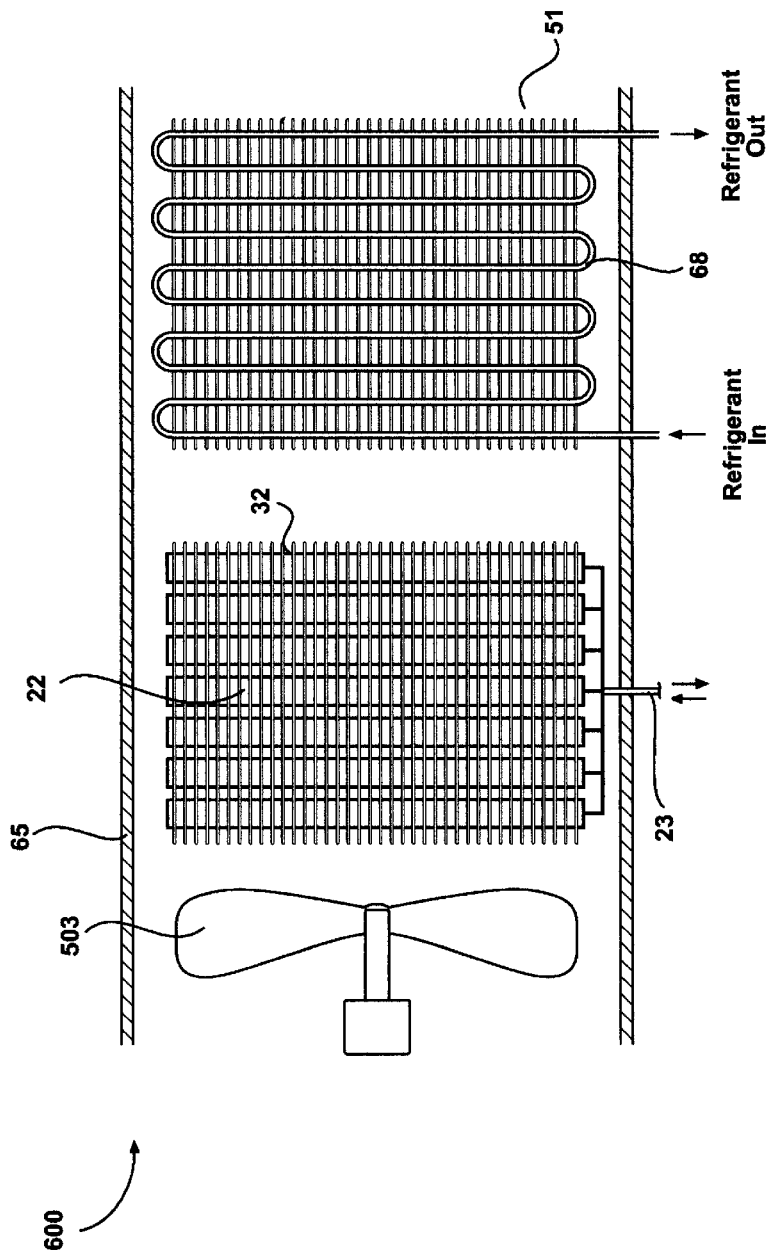
FIG. 6 is an illustration of an embodiment of the heat retriever module of the present invention that shows the heat retriever module integrated with a condenser into a single compartment.

Referring to FIGS. 5 and 6, an embodiment of the present invention in the thermal coupling between the condenser coil and the heat retriever module of the metal hydride based air preconditioner is illustrated, generally referred to as 600. The geometrically separated heat retriever module 22 and condenser 501 are encased in a housing 67. Three components may be the heat retriever module 22, condenser coil 68 of an air conditioner, and electric fan 503, preferably a reversible electric fan. A tube or pipe 23 for transferring hydrogen into or out of the heat retriever module 22 to or from the dehumidifier/cooler module 20, and pipelines 69A and 69B for transporting refrigerant into and out from the condenser coil 68. Preferably, the construction material for the tube or pipe 23 is stainless steel, brass or copper. Preferably, the construction material for the pipelines 69A and 69B is copper. The housing 67 confines the airflow from the condenser 51 to the heat retriever module 22 to achieve effective heat exchange through convection. As the electric fan 503 draws air in from the side of condenser 501, the air passing through the hot condenser coil 68 transfers the heat to the heat retriever module 22, and the heat drives the hydrogen out. In the next half cycle, the heat retriever module 22 needs to be cooled to absorb back the hydrogen released in the previous half cycle. To accomplish that, the electric fan 503 reverses rotation to draw outside air from the side of heat retriever module 22. The ambient air cools both, the heat retriever module 22 and the condenser coil 68. With the half cycle of cooling completed, the electric fan 503 changes rotation direction again to repeat the heating phase.

Therefore, the cooling and heating cycle of the heat retriever module 22 is realized by simply changing the rotation direction of the electric fan 503.

The condenser 501 may function as a means for providing heat to the heat retriever. However, a separate heater may be integrated a means for providing heat. The illustrated embodiments that incorporate the present invention for use with an air conditioner are more preferred, because the addition of a separate heating element may add to the energy consumption of the overall system. Referring to FIG. 5, by using heat from the condenser 501 to heat the heat retriever 22, the preferred embodiment of the current invention utilizes waste heat from an existing source, i.e. the condenser 501, in the system. The means for providing heat to the heat retriever 22 may use any heat source that is able to increase the temperature of the heat retriever 22 to 100° C. and above, preferably to 120° C. For example, a solar powered heater may be incorporated as a means for providing heat to the heat retriever to reduce the energy consumption of the system, especially when the present invention is used independent of an air conditioner. Further, solar energy may be incorporated to power the fans or any other cooling apparatus.

Figure 7:
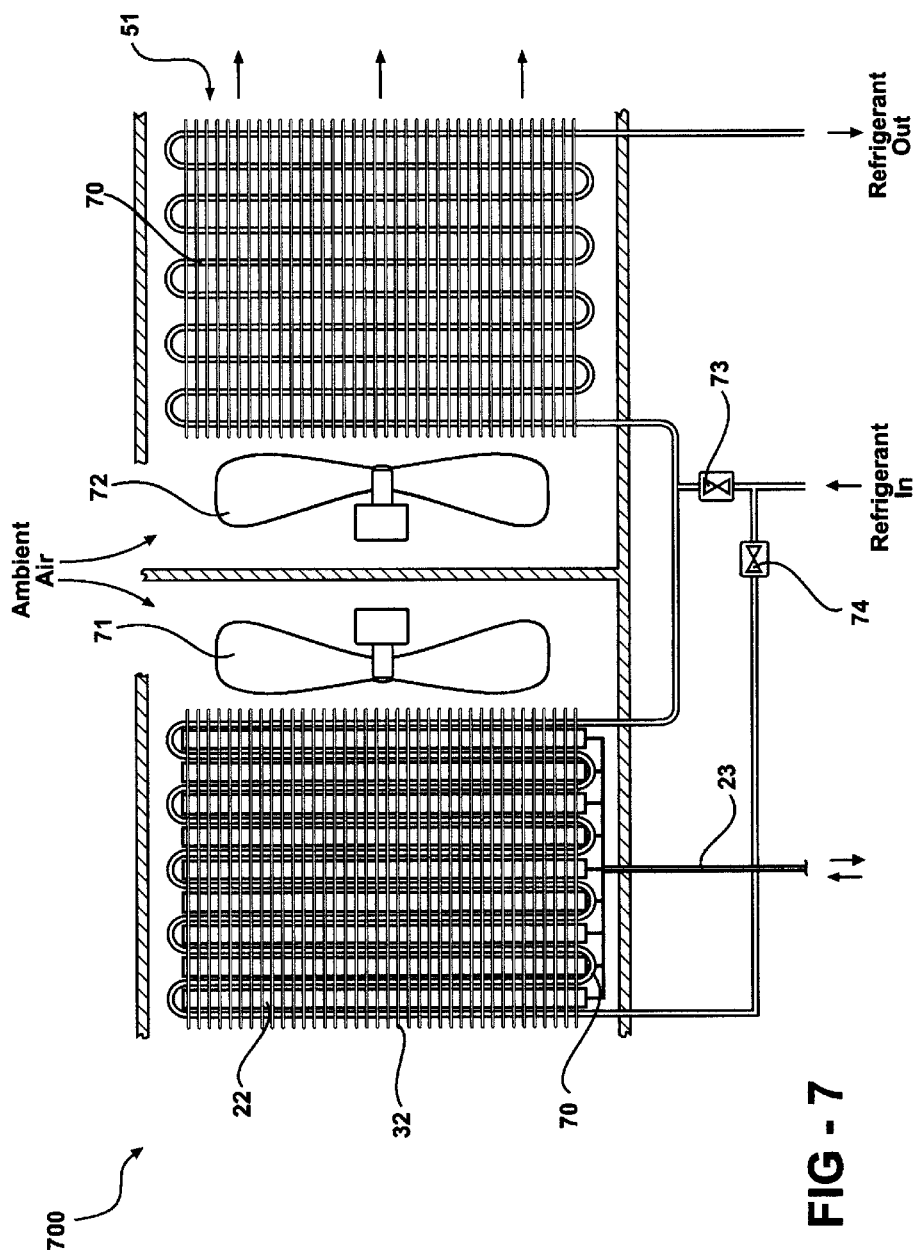
FIG. 7 is an illustration of an embodiment of the heat retriever module of the present invention that shows the heat retriever module integrated with a condenser into two separate compartments.

In a preferred embodiment, generally referred to as 700, the heat retriever module 22 and condenser 501 are in separate compartments, as illustrated in FIG. 7. The condenser coil 70 may be divided as two portions with one segment built run through the heat retrieve module 22, and the segment built to run through the condenser 501. Preferably, the compartments are arranged to allow for the flow of ambient air into the compartments. The flow of refrigerant may be controlled by a first valve 73 and a second valve 74, both of which may be operably coupled to the control unit 508. The refrigerant may be set to flow through the condenser coil 70 portions in the heat retriever 22 and the condenser 501 or the refrigerant may be set to flow through the condenser only. When the heat retriever module 22 is in the phase of heat absorption, the first valve 73 is closed and the second valve 74 is opened. The refrigerant is pumped from the cooling coil through the condenser coil 70 by the refrigerant compressor 512. By setting the first valve 73 to open and the second valve 74 to close, refrigerant is able to flow through the condenser 501 but not the heat retriever 22. As a result, the heat retriever 22 is capable of being heated by the waste heat carried by the refrigerant. During the phase of heating, the cooling fan 71 in the heat retriever module 22 compartment is off, but the cooling fan 72 in the second compartment is on. When the heat retriever module 22 is in the phase of cooling, the first valve 73 opens and second valve 74 closes, with the cooling fans 71 and 72 running to dissipate heat. By setting the first valve 73 to open and the second valve 74 to close, the refrigerant is able to flow through only the condenser 501. At this time, the heat retriever 22 may be cooled by a cooling fan 71. With the heating and cooling cycles of the heat retriever module 22 driven by condenser 501 waste heat and at least one electric fan 71, the associated cooling module 20 accomplishes the function of dehumidifying and cooling passing air. The valves 73 and 74 are preferably solenoid valves, however, other types of valves may be used.

The present invention built according to the above-embodiments is energy saving and environmentally friendly. It may achieve energy conservation by two means, when used in conjunction with an air conditioner. The first is to dehumidify/cool air by recovering energy from the waste heat of the condenser of the air conditioner. The second is to cut power consumption by improving the efficiency of the air conditioning system, because the metal hydride based outside air economizer of the present invention realizes the separation of dehumidification and air-cooling. When used independent of an air conditioner, heat may be supplied by a heating element, such as a solar powered heater that utilizes even less energy to operate.

Figure 4:
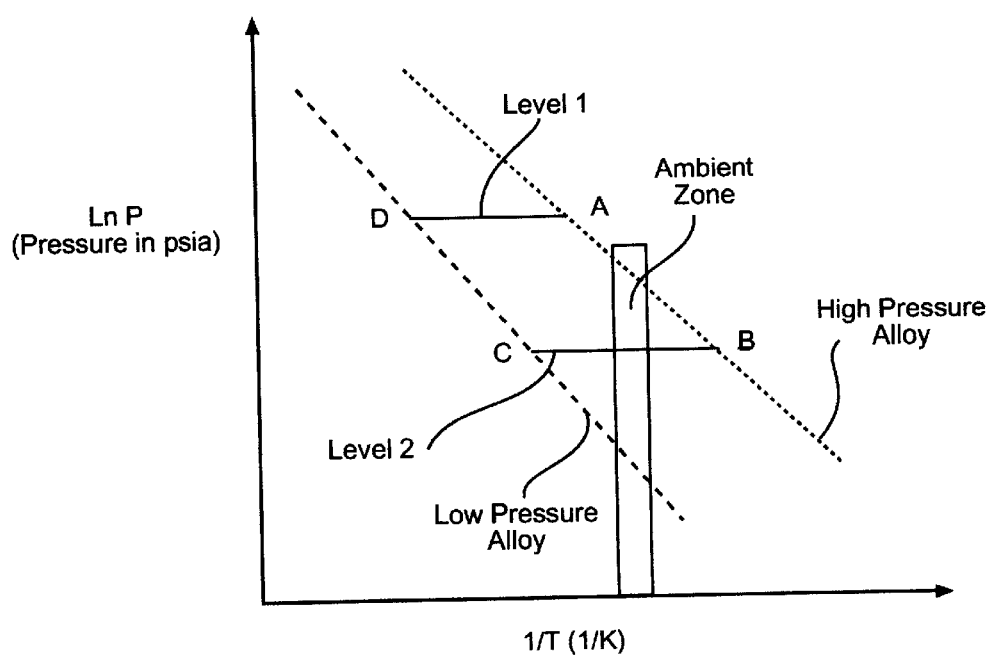
FIG. 4 is a graphical illustration of the thermal cycle path on van't Hoff chart of a metal hydride based dehumidifier having two modules.

Referring to FIGS. 4 and 5, the operation mechanism of the metal hydride dehumidifier/cooler can be understood by following the thermal path on the van't Hoff chart of FIG. 4. As the heat of the condenser 501 raises the temperature of the heat retriever 22 to TD, the hydrogen released from the heated heat retriever 22 increases gas pressure to level I as the valve 24 is held closed. After the valve 24 opens at level I, the cooling module 20 starts to absorb hydrogen and its temperature also starts to increases upward, reaching the equilibrium temperature $T_A$. When the metal hydride in the cooling module 20 is fully charged, the valve 24 closes. Subsequently, the forced air from a fan 502 dissipates the residual heat of the cooling module 20, and reduces its temperature to ambient zone. At the same time as the cooling module 20 cools, the temperature of heat retriever 22 is also reduced toward $T_C$, where the inside hydrogen gas pressure reaches level II. At that point, the valve 24 is triggered to open. The hydrogen gas in the cooling module 20 escapes back to the heat retriever 22. The endothermic hydrogen desorption from the cooling module 20 reduces its temperature to $T_B$. During the cooling phase of the cooling module 20, the water content of passing air is reduced.

One cycle is the transfer of hydrogen from the heat retriever module to the cooling module then back to the heat retriever. As the rate of the cycles is increased the cooling capacity, in heat absorption per unit time, is increased. The cycle frequency depends on the characteristics of the hydrogen storage material and the heat exchange of the modules.

When the cooling phase is done, the heating phase of the cooling module 20 is repeating. As this cycle goes on, damp air passing through the cooling module 20 dehumidifies and absorption heat of the cooling module 20 is removed to outside air. The dehumidification process can be expressed in the following equation:

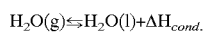
$$H_2O(g) \leftrightarrows H_2O(l) + \Delta H_{cond.}$$

According to the Handbook of Chemistry and Physics, the enthalpy of water condensation at 25° C. is 43.99 kJ/mole, which means that one liter of water condensation out of humid air releases heat of about 2,500 kJ. Assuming that a dehumidification capacity of 2 liter/hour is required for a typical residential building, the metal hydride cooling module 20 (high pressure metal hydride) needs to have a cooling capacity of at least 5,000 kJ/hour.

The following is a description of the theory for the use of a hydrogen storage material to supply cooling. $H_2$ absorption by a metal or alloy is a three-step process. First, $H_2$ molecule is weakly physisorbed on the surface, then dissociatively chemisorbed as strongly bound, individual H atoms, finally the H atoms diffuse away from the surface into interstitial sites in the lattice sites of the multi-component material. Interstitial diffusion rates of $10^{12}$ jumps per second are possible through the periodic lattice potential field, even near room temperature. Once in the crystal lattice, H-atoms can take the form of a random solid solution or an ordered hydride structure with distinct bonding to metal atoms and high volumetric packing density.

Depending on the bonding strength between hydrogen atoms and the metallic atoms, hydrogen absorbed in the metallic matrix can be reversibly desorbs with pressure relieved or heat introduced. The hydrogen absorption is exothermic reaction, while hydrogen desorption is endothermic. The hydriding/dehydriding reaction of metal or alloy is thermodynamically expressed as:

$$M + x/2 H_2 \leftrightarrows MH_x + Q \tag{Eq.1}$$

Where Q is the exothermic or endothermic heat for hydrogen absorption and desorption respectively.

EXAMPLE

For a typical transition metal alloy hydride, for example an alloy having the composition of 29.97% Ti, 3.33% Zr, 14.82% V, 43.30% Mn and 8.58% Ni (the preceding values in atomic percent), one cooling cycle absorbs heat of approximately 25 kJ with one mole (2 grams) of $H_2$ in and out. A cooling module containing one kilogram of metal hydride with a hydrogen storage capacity of 2 wt % has a cooling capacity of 250 kJ per cycle. If the metal hydride based dehumidifier/cooler is able to achieve 10 cycles per hour, it gives rise to a cooling capacity of 2,500 kJ/hour. By this analysis, a metal hydride cooling module packed with 4 kg MH that has similar hydriding enthalpy has a potential cooling capacity of 10,000 kJ/hour. With the worst scenario of water condensation efficiency of the metal hydride based system to be 50%, it achieves a dehumidification capacity of 2 liter/hour, which meets a typical need for a residential building. Further, the air cooling function reduces the air temperature that consequently reduces the power needed to run an air conditioner.

Figure 1:
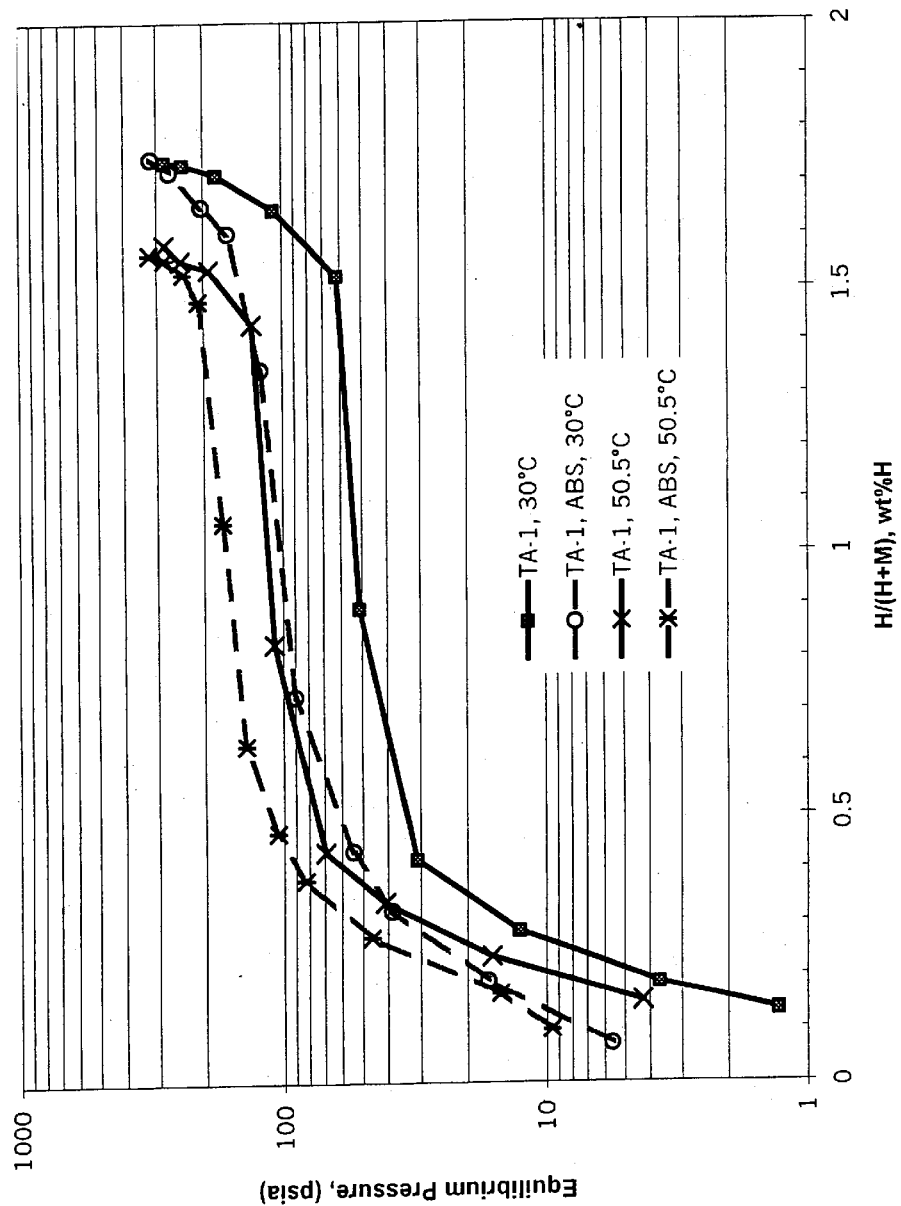
FIG. 1 is a graphical representation of a typical absorption and desorption pressure-composition-isotherm for a transition metal alloy hydride.

A more precise description of metal-hydrogen reaction equilibrium is given by pressure-composition-isotherm (PCT). A typical absorption and desorption PCT is shown in FIG. 1 for the above referenced transition metal alloy hydride, 29.97% Ti, 3.33% Zr, 14.82% V, 43.30% Mn and 8.58% Ni, referred to as TA-1 in FIG. 1. For this particular alloy, pressure plateaus of absorption/desorption are exhibited. The slope of the plateau varies with metal-hydrogen systems. For the same metal or alloy, the desorption plateau pressure is always lower than absorption plateau pleasure. The difference between them is called hysteresis.

The equilibrium $H_2$ plateau pressure P is ideally a function of temperature only, which is described by the well-known van't Hoff equation:

$$\ln P = \Delta H/RT - \Delta S/R \tag{Eq.2}$$

Where R is the gas constant. According to equation 2, the plot of lnP vs. 1/T (van't Hoff plot) is a straight line, the slope of which gives ΔH, and the intercept (1/T=0) gives the value of ΔS. The value of ΔH can vary widely from metal to metal and is a measure of the strength of the M—H bond. ΔS does not vary as much. Since the hydriding reaction is driven by lowering Gibbs free energy, the hydriding enthalpy ΔH is negative. The enthalpy change ΔH is typically ranging from −10 to −100 kJ/mol $H_2$, and entropy change ΔS associated with it, typically ranging from −0.09 to 0.15 kJ/K-mol $H_2$. At the same temperature, the metal hydride with higher equilibrium plateau pressure generally has lower hydriding enthalpy. Accordingly, at the same plateau pressure, the metal hydride with lower equilibrium temperature tends to have higher hydriding enthalpy.

By measuring the equilibrium plateau pressures of above referenced alloy at temperatures 0, 30, and 50.5° C., we obtain 0.688, 1.695, and 2.346 atm (atmospheres) respectively. Plotting these data in a van't Hoff chart, illustrated in FIG. 4, it results in $\Delta H = -24.4$ kJ/mol $H2$, and $\Delta S = -0.094$ Kj/K-mol $H2$.

While the invention has been illustrated in detail in the drawings and the foregoing description, the same is to be considered as illustrative and not restrictive in character as the present invention. It will be apparent to those skilled in the art that variations and modifications of the present invention can be made without departing from the scope or spirit of the invention. For example, the dimensions fins and tubes, shape of the modules, the system of conduits, the various valves, source of heat and the position of the fans can be varied without departing from the scope and spirit of the invention. The materials used to construct the various elements used in the embodiments of the invention, such as the modules, tubes, fins, hydrogen storage material may be varied without departing from the intended scope of the invention. Furthermore, it is appreciated that the metal hydride based air preconditioner of the present invention may be integrated in positions other than those described and illustrated without departing from the spirit and scope of the invention. Further more, by using one or more of the embodiments described above in combination or separately, it is possible to pretreat air incoming to an air conditioner, so that the air conditioner uses less power and overall energy savings is realized. Thus, it is intended that the present invention cover all such modifications and variations of the invention, that come within the scope of the appended claims and their equivalents.

We claim:

1. An apparatus for cooling and dehumidifying air comprising:
   a first hydrogen storage module having a first pressure, said first hydrogen storage module having a first hydrogen storage material;
   a second hydrogen storage module having a second pressure, said second hydrogen storage module in flow communication with said first hydrogen storage module, said second pressure at ambient temperature lower than said first pressure at ambient temperature, said second hydrogen storage module having a second hydrogen storage material;
   a valve, said valve providing flow communication between said first hydrogen storage module and said second hydrogen storage module;
   a means for providing heat to said second hydrogen storage module;
   a means for cooling said first hydrogen storage module; and
   a means for cooling said second hydrogen storage module.

2. The apparatus of claim 1, further comprising a control unit, said control unit operably coupled to said first hydrogen storage module, said second hydrogen storage module, said means for cooling said first hydrogen storage module, said means for cooling said second hydrogen storage module and said valve.

3. The apparatus of claim 1, said second pressure comprising ambient pressure.

4. The apparatus of claim 3, said first pressure sufficiently higher than said second pressure to force hydrogen gas from said second hydrogen storage module to said first hydrogen storage module as said second hydrogen storage module is heated.

5. The apparatus of claim 4, said first pressure comprising at most 300 psia.

6. The apparatus of claim 1, further comprising a first air conduit and a second air conduit, said first air conduit having a first end terminating in an area to be cooled and a second end terminating in an area outside said area to be cooled, said second air conduit having a first end terminating in an area to be cooled and a second end terminating in said first air conduit, wherein said first hydrogen storage module is set in said first air conduit between said first end of said first air conduit and said second end of said second air conduit.

7. The apparatus of claim 6, further comprising a third air conduit and a fourth air conduit, said third air conduit having a first end connected to said second end of said first air conduit and a second terminating in said area outside said area to be cooled, said fourth air conduit having a first end terminating in said first air conduit and a second end terminating in said area outside said area to be cooled.

8. The apparatus of claim 7, further comprising an air filter set in said third air conduit.

9. The apparatus of claim 7, further comprising a means for restricting air flow in said first air conduit and a means for restricting air flow in said second air conduit.

10. The apparatus in claim 9, said means for restricting air flow in said first air conduit comprising a first damper set in said first conduit and said means for restricting air flow in said second air conduit comprising a second damper set in said second air conduit.

11. The apparatus of claim 10, said first damper adapted to shift from restricting air flow through said first end of said first air conduit and restricting air flow through said first end of said fourth air conduit and said second damper adapted to shift from restricting air flow through said second end of said second air conduit and restricting air flow through said second end of said first air conduit.

12. The apparatus of claim 1, said means for providing heat comprising a condenser having a condenser coil, said condenser positioned proximate to said second hydrogen storage module, said second hydrogen storage module contacting heat emitted from said condenser and said condenser coil running through said condenser.

13. The apparatus of claim 12, said condenser coil in flow communication with a refrigerant pump, said refrigerant pump pumping refrigerant through said condenser coil.

14. The apparatus of claim 12, further comprising at least one reversible second module fan adapted to force warm from said condenser to said second hydrogen storage module.

15. The apparatus of claim 1, said means for providing heat comprising refrigerant pumped through a condenser having a condenser coil, said condenser separated compartmentally from said second hydrogen storage module, said second hydrogen storage module capable of contacting heat emitted from refrigerant flowing through said condenser coil.

16. The apparatus of claim 15, said condenser coil adapted to run through said condenser and said second hydrogen storage module.

17. The apparatus of claim 16, further comprising at least one condenser fan adapted to force cooling air toward said condenser.

18. The apparatus of claim 1, said means for cooling said first hydrogen storage module comprising at least one reversible first module fan positioned to force air to and from said first hydrogen storage module and said means for cooling said second hydrogen storage module comprising at least one reversible second module fan positioned to force air to and from said second hydrogen storage module.

19. The apparatus of claim 1, said means for providing heat comprising a solar powered heater, said second hydrogen storage module positioned to contact heat emitted from said solar powered heater.

20. The apparatus of claim 16, further comprising a first condenser coil valve and a second condenser coil valve, each of said condenser coil valves in flow communication with a refrigerant in port, wherein said first condenser coil valve controls flow of refrigerant to said condenser and said second condenser coil valve controls flow of refrigerant to said second hydrogen storage module.

21. The apparatus of claim 6, said first hydrogen storage module having thermally conductive material in contact with air flowing past said first hydrogen storage module, said thermally conductive material in thermal contact with said first hydrogen storage material.

22. A method of cooling and dehumidifying air comprising;
- providing a first hydrogen storage module having a first pressure and a first hydrogen storage material in flow communication with a second hydrogen storage module having a second pressure and a second hydrogen storage material, said first pressure at ambient temperature higher than said second pressure at ambient temperature;
- a first closing of a valve between said first hydrogen storage module and said second hydrogen storage module;
- heating said second hydrogen storage module, said heating causing an increase in said second pressure and a desorption of hydrogen gas from said second hydrogen storage material;
- a first opening of said valve, said first opening causing hydrogen gas to flow from said second hydrogen storage module into said first hydrogen storage module and an increase in temperature of said first hydrogen storage module;
- a second closing of said valve;
- cooling said first hydrogen storage module;
- cooling said second hydrogen storage module, said cooling said second hydrogen storage module reducing said second pressure; and
- a second opening of said valve, said second opening causing hydrogen gas to flow from said first hydrogen storage module into said second hydrogen storage module and desorption of hydrogen gas from said first hydrogen storage material, said desorption cooling said first hydrogen storage module and dehumidifying and cooling air flowing past said first hydrogen storage module.

23. The method of claim 22, said heating said second hydrogen storage module comprising forcing warm air from a condenser into contact with said second hydrogen storage module.

24. The method of claim 23, said forcing warm air comprising at least one reversible fan forcing air from said condenser into contact with said second hydrogen storage module.

25. The method of claim 24, said cooling said second hydrogen storage module comprising said at least one reversible second module fan forcing cool air toward said second hydrogen storage module and forcing warm air from said condenser away from said second hydrogen storage module.

26. The method of claim 22, said cooling said first hydrogen storage module comprising a at least one first module fan forcing cool air toward said first hydrogen storage module.

27. The method of claim 22, further comprising draining moisture accumulated from said dehumidifying.

28. The method of claim 22, said heating of said second hydrogen storage module comprising guiding refrigerant from a condenser having a condenser coil through said second hydrogen storage module, said second hydrogen storage module contacting heat emitted by said refrigerant.

29. The method of claim 22, further comprising:
- forcing warm air from an area to be cooled in through a second air conduit during said desorption;
- diverting said warm air from said second air conduit into a first air conduit, said first hydrogen storage module set in said first air conduit; and
- forcing said cooled air into said area to be cooled through said first air conduit.

30. The method of claim 29, further comprising:
- restricting air flow to said area to be cooled during said heating of said second hydrogen storage module;
- restricting air flow in said second air conduit; and
- diverting air through a fourth air conduit, said fourth air conduit having a first end terminating in said first air conduit and a second end terminating in an area outside said area to be cooled.

31. The method of claim 22, wherein said heating said second hydrogen storage module comprises forcing warm air from said a solar powered heater into contact with said second hydrogen storage module.

32. The method of claim 22, said dehumidifying comprising collecting moisture on thermally conductive material in thermal contact with said first hydrogen storage material, said thermally conductive material in contact with said air flowing past said first hydrogen storage module.

* * * * *